US006986075B2

(12) United States Patent
Ackaret et al.

(10) Patent No.: US 6,986,075 B2
(45) Date of Patent: Jan. 10, 2006

(54) STORAGE-DEVICE ACTIVATION CONTROL FOR A HIGH-AVAILABILITY STORAGE SYSTEM

(75) Inventors: Gary R. Ackaret, Meridian, ID (US); Susan Checchi, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 557 days.

(21) Appl. No.: 09/792,443

(22) Filed: Feb. 23, 2001

(65) Prior Publication Data

US 2002/0162048 A1 Oct. 31, 2002

(51) Int. Cl.
*G06F 11/00* (2006.01)
(52) U.S. Cl. .............................. 714/4; 714/6
(58) Field of Classification Search ............ 714/6, 714/7, 4, 47; 711/114
See application file for complete search history.

(56) References Cited

U.S. PATENT DOCUMENTS

| | | | | |
|---|---|---|---|---|
| 5,148,432 | A * | 9/1992 | Gordon et al. ................. | 714/7 |
| 5,878,201 | A * | 3/1999 | Onishi ........................... | 714/6 |
| 5,880,955 | A * | 3/1999 | Matoba et al. ................ | 700/83 |
| 5,966,510 | A * | 10/1999 | Carbonneau et al. ......... | 714/44 |
| 6,079,029 | A * | 6/2000 | Iwatani et al. ................ | 714/6 |
| 6,088,766 | A * | 7/2000 | Bachmat et al. ............. | 711/114 |
| 6,131,142 | A * | 10/2000 | Kamo et al. .................. | 711/114 |
| 6,154,853 | A * | 11/2000 | Kedem ........................... | 714/6 |
| 6,282,670 | B1 * | 8/2001 | Rezaul Islam et al. ........ | 714/6 |
| 6,289,398 | B1 * | 9/2001 | Stallmo et al. ................ | 710/5 |
| 6,405,329 | B1 * | 6/2002 | Colligan et al. .............. | 714/57 |
| 6,493,656 | B1 * | 12/2002 | Houston et al. ............. | 702/187 |
| 6,583,947 | B1 * | 6/2003 | Hakamata et al. ........... | 711/114 |
| 6,598,174 | B1 * | 7/2003 | Parks et al. .................... | 714/6 |
| 6,675,129 | B1 * | 1/2004 | Cambon et al. ............ | 702/182 |
| 6,725,385 | B1 * | 4/2004 | Chu et al. ................... | 713/320 |
| 6,782,487 | B2 * | 8/2004 | Gotoh et al. ................... | 714/7 |
| 2002/0073362 | A1 * | 6/2002 | Arnaout et al. .............. | 714/42 |

FOREIGN PATENT DOCUMENTS

JP 2001249831 * 9/2001

OTHER PUBLICATIONS

"Method For Tracking Power-On Time of a Device with no Overhead," IBM technical Disclosure Bulletin, Apr. 2000, Issue 432, p. 759.*

* cited by examiner

*Primary Examiner*—Robert Beausoliel
*Assistant Examiner*—Marc Duncan

(57) ABSTRACT

Implementations of this invention provide improved technology for storage-device activation control in high-availability storage systems and tracking of in-service data statistics of storage-devices. Typical high-availability storage systems include a fault-tolerant redundant array of storage devices, such as disk drives. The invention may be implemented with one or more inactive (un-powered) drives physically installed in the storage system, but not part of the present fault-tolerant redundant array of disk drives. When a drive fails, one of the inactive drives is activated (powered-on) and it replaces the failed disk and becomes part of the present array. With the newly activated disk included, the data is reconstructed and the original fault-tolerance level is restored. Furthermore, the invention may be implemented so that it tracks the actual in-service time of the storage devices (such as disk drives). Field-derived, empirical data about actual in-service time of storage devices is collected and transmitted to a central data collection system. Using this actual data as a basis, a much more accurate MTBF may be calculated than the MTBF conventionally calculated.

8 Claims, 4 Drawing Sheets

(background)

(background)

STORAGE-DEVICE ACTIVATION CONTROL FOR A HIGH-AVAILABILITY STORAGE SYSTEM

TECHNICAL FIELD

This invention relates to improved techniques for controlling and/or monitoring storage devices in a high-availability storage system.

BACKGROUND

Some computer systems are dedicated storage systems. These storage systems typically include one or more arrays of rotating magnetic disks for secondary, non-volatile storage of data. Typically, a storage system may include an enclosure, power supply, cooling fans, and disk array controller(s).

These disk arrays are sometimes colloquially called "Just a Bunch Of Disks" or alternatively "Just a Box Of Disks" (JBOD). A JBOD is an array of disk drives that are specially designed to improve control, performance, and fault tolerance of such a disk-array storage system.

FIG. 1 shows an example of a conventional computer network 10 having a central computer 20 for controlling the system and for central processing. Of course, such a central computer (i.e., server) may be composed of many interconnected computers. In addition to other functions, the central computer 20 controls and monitors multiple storage systems, such as storage system 30, storage system 32, and storage system 34.

FIG. 2 shows a block diagram of the basic components of a typical storage system, in particular, storage system 30. It includes an input/output (I/O) unit 52 for sending/receiving data and control information to/from the central computer 20, other storage systems, and other network devices. A disk array controller 54 is coupled to the I/O unit 52 and to a disk array 60. One or more data and control lines connect the disk array controller 54 to the disk array 60. Of course, a storage system may include multiple controllers and multiple disk arrays.

In a conventional storage system (like the one illustrated in FIG. 2), all disk drives in an array are powered by a power supply. Typically, the supply of power to the drive is not controllable or selectable.

Redundant Array of Independent Disks (RAID)

A common high-availability storage solution is a Redundant Array of Independent (or Inexpensive) Disks (RAID). RAID is a high-availability storage system that employs two or more drives in combination.

RAID was designed as a means for improving storage subsystem capacity. However, there was a problem with this implementation. The resulting "mean time before failure" (MTBF) of the array was actually reduced due to the probability of any one drive of the array failing. As a result of this finding, the RAID developers proposed multiple levels of RAID to provide a balance of performance and data protection.

Conventionally, RAID schemes are classified into five basic levels (although other levels may exist):
- a first level in which the same data are stored on two disks ("mirrored" disks);
- a second level in which data are bit-interleaved across a group of disks, including check disks on which redundant bits are stored using a Hamming code;
- a third level in which each group has only a single check disk (sometimes called a "parity" disk), on which parity bits are stored;
- a fourth level that uses block interleaving and a single check disk per group; and
- a fifth level that uses block interleaving and distributes the parity information evenly over all disks in a group, so that the writing of parity information is not concentrated on a single check disk.

For all RAID levels, fault-tolerant arrays often have an additional disk in the array. This is the "check" disk. This disk acts as the replacement disk when one disk in the array fails. The data on a failed disk are conventionally reconstructed; then the reconstructed data are written onto the replacement disk. This places the replacement disk in exactly the same state as the failed disk.

MTBF

MTBF is short for "mean time between failures" or "mean time before failure." Typically, MTBF ratings are measured in hours and indicate the sturdiness of hard disk drives, printers, and virtually any other component.

Typical inexpensive disk drives for personal computers have MTBF ratings of about 300,000 hours. This means that of all the drives tested, one failure occurred every 300,000 hours of testing. However, this measure is only a statistical model based upon test drives and estimated operation time of failed drives returned to the factory.

The theoretical MTBF of a disk drive represents the steady state failure rate of a large population of drives in volume manufacture. This is the expected time after the initial burn-in phase that it will take a hardware component to fail due to normal wear and tear.

Calculating Theoretical MTBFs. Most discussions of a computer's MTBF focus on its disk drives' MTBFs for several reasons. Primarily, components with moving parts (such as disk drive actuators and motors) typically have significantly lower MTBFs than non-moving components (such as memory chips or main CPU boards). Because a computer's theoretical MTBF is most influenced by the MTBF of the least reliable component as well as the sheer number of components, disk drive MTBFs typically dominate the overall computer system's theoretical MTBF.

Theoretical MTBF of a computer decreases in proportion to the number of components that make up the computer. Therefore, larger configurations containing many disk drives, by definition, have a lower overall MTBF.

A system's overall theoretical MTBF is calculated from the theoretical MTBFs of the components that make up the system:

$$MTBF = \frac{1}{\frac{1}{N_1} + \frac{1}{N_2} + \frac{1}{N_3} + \ldots + \frac{1}{N_x}}$$

where

N=MTBF of each component x=the number of components in the configuration

The overall MTBF of a disk drive subsystem is in direct proportion to the number of disks in the array. For example, the MTBF of a disk drive subsystem consisting of two disk drives with identical 300,000 hour MTBFs is:

$$\text{Disk drive subsystem } MTBF = \frac{1}{\frac{1}{300,000} + \frac{1}{300,000}}$$

=150,000 hours, which is exactly half the MTBF of each disk drive

Similarly, a 10-drive configuration MTBF is one-tenth the MTBF of a single drive, or 30,000 hours, and a 100-drive configuration is reduced to 3,000 hours. Some large systems include 1000-drive (or more) storage configurations, which are likely to require that a failed drive be replaced every one to two weeks (on average).

Actual Time Before Failure Compared to MTBF

The MTBF is intended to give a statistical model of the failure times of a large population of drives. The MTBF is not a good measure for the actual time before a given drive fails. One reason is the collection of disk drives used by an installation is not always representative of a large random sample (as assumed by the statistical model). Another reason that MTBF is not a good measure for the actual time before a given drive fails is a lack of empirical data about drives in actual service.

Non-representative Samples. Installations typically purchase drives in bulk. They are likely to receive drives with sequential serial numbers because the drives were collectively shipped right from the assembly line of a factory to the large installations.

Often problems that cause a drive to fail are inadvertently introduced during the manufacturing process. The induction of dust particles and other particulate matter is a common cause of ultimate drive failures. It is typical for such problems to be introduced to a collection of sequentially manufactured drives.

Therefore, an array of drives in an installation may have a higher risk for drive failure than is represented by a theoretical MTBF calculation. Furthermore, these sequential drives are more likely to fail at approximately the same time because their inherent flaws are similar.

Lack of Empirical Data. The basis of the MTBF calculation for a disk drive is the measured failure rate in a testing facility. Often the calculation is based upon failure data of similar components in previous models. This facility may be part of the manufacturing process, such as a "burn-in" step. It may also be independent of the manufacturing process, such a dedicated testing laboratory. Both options only estimate how the drive is actually used in the field.

Drive manufacturers typically guess at the actual operating life of a drive model by knowing how many drive models were sold, knowing how many were returned after they failed, and comparing the manufacture date to the returned date. This is only a guess. This does not accurately measure the actual life and use of a drive.

Conventionally, there is no technique to accurately measure how drives are used in the field; therefore, it is difficult, at best, to determine the accuracy of the artificial failure rates estimated by development engineering.

SUMMARY

Described herein is an improved technology for storage-device activation control in high-availability storage systems and tracking such activations. Typical high-availability storage systems include a fault-tolerant redundant array of storage devices, such as disk drives. Such systems are designed to withstand the failure of X number drives without a loss of data. When a drive fails, the data is reconstructed from the redundancy information on the remaining drives. After X number of drives have failed but before a conventional manual replacement of such failed drives, the data is highly vulnerable to loss if another drive fails.

An example of the storage-device activation control described herein is implemented with one or more inactive (un-powered) drives physically installed in the storage system, but not part of the present fault-tolerant redundant array of disk drives. When a drive fails, one of the inactive drives is activated (powered-on) and it replaces the failed disk and becomes part of the present array. With the newly activated disk included, the data is reconstructed and the original fault-tolerance level is restored. Since a new disk quickly and automatically (without human intervention) replaces the failed disk in the array, the risk of data loss (based upon another drive failing before the first failure is remedied) is greatly reduced.

Furthermore, another example of the storage-device activation control described herein is implemented so that it tracks the actual in-service time of the storage devices (such as disk drives). Field-derived, empirical statistical data about actual in-service time of storage devices is collected and transmitted to a central data collection system. Using this actual data as a basis, a much more accurate MTBF may be calculated than the MTBF conventionally calculated.

BRIEF DESCRIPTION OF THE DRAWINGS

The same numbers are used throughout the drawings to reference like elements and features.

DETAILED DESCRIPTION

The following description sets forth one or more specific embodiments of a storage-device activation control for a high-availability storage system that incorporates elements recited in the appended claims. The embodiments are described with specificity in order to meet statutory requirements, such as written description, enablement, and best-mode. However, the description itself is not intended to limit the scope of this patent. Rather, the inventors have contemplated that the claimed invention might also be embodied in other ways, in conjunction with other present or future technologies.

Described herein are examples the storage-device activation control for a high-availability storage system. Each example may be referred to as an "exemplary storage-device activation control." Those of ordinary skill in the art understand and appreciate that an exemplary storage-device activation control may be implemented on any computer system (or network) with one or more arrays of storage devices. Therefore, references herein to storage systems are applicable to any similar computer system (or network) with at least one array of storage devices.

Furthermore, each exemplary storage-device activation control is described herein in the context of "disk drives." Those of ordinary skill in the art understand and appreciate that each exemplary storage-device activation control may be implemented with any variety of secondary, non-volatile storage devices. Therefore, references herein to disk drives are applicable to any similar secondary, non-volatile storage devices.

Examples of an "activation status" of a storage device may be either active (powered on) or inactive (powered off). The "field-derived, empirical statistical data about the actual in-service time of a storage device" is described herein. By way of example, this refers to data about the actual in-service time of a storage device (such as a disk drive) that is measured in the field. This terminology distinguishes itself from data derived in a testing facility because such data is not field-derived and is not related to actual in-service time. This terminology also distinguishes itself from data derived from statistical models for similar reasons.

Storage System Implementing Exemplary Storage-Device Activation Control

Figure 3:
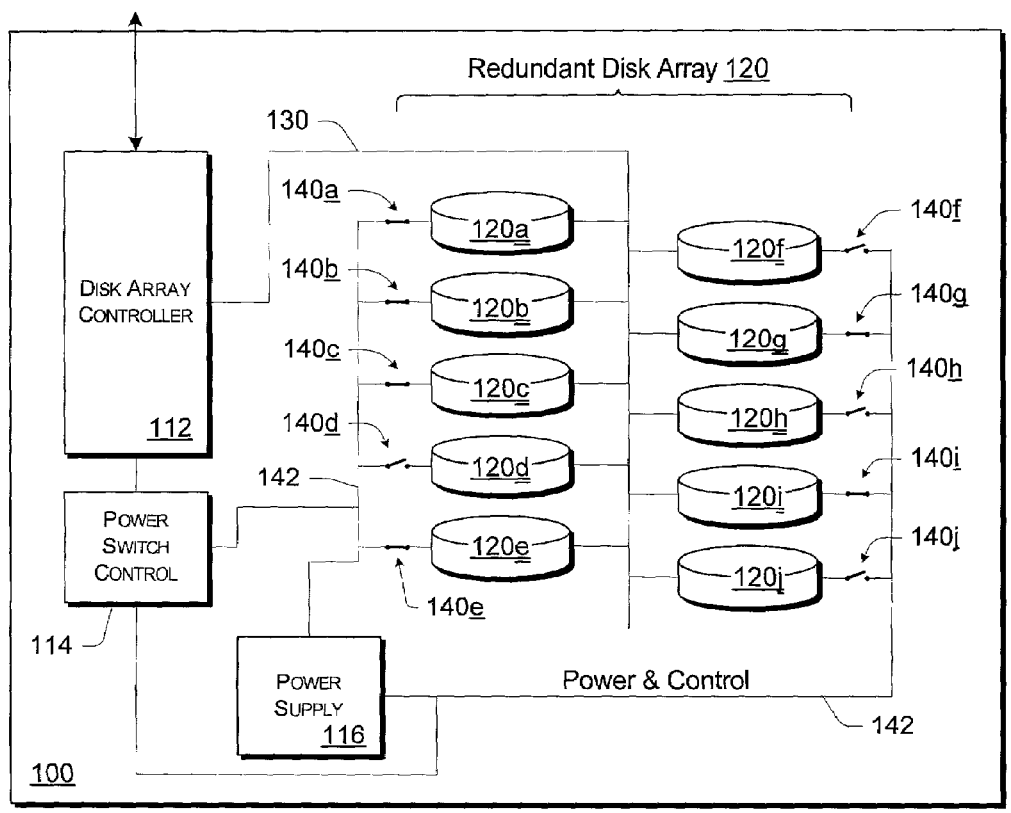
FIG. 3 is a block diagram of the basic components of a storage system implementing storage-device activation control for a high-availability storage system.

FIG. 3 shows a block diagram of the basic components of an exemplary storage system 100 that implements the exemplary storage-device activation control. The storage system 100 includes a disk array controller 112 coupled to a disk array 120. The disk array controller may be composed of several basic computer components, such as an input/output (I/O) unit, bus adapters, etc. The I/O unit is for sending/receiving data and control information to/from other network devices.

One or more data and control lines (such as line 130 in FIG. 3) connect the disk array controller 112 to the disk array 120. The disk array 120 includes a set of disk drives 120a–j.

Although only one controller and one JBOD are shown in FIG. 3, a storage system implementing a storage-device activation control may include multiple controllers and multiple JBODs. A storage system implementing a storage-device activation control typically have other conventional computer components, such as a CPU, system memory, one or more buses, other I/O systems, communications, and the like.

The storage system 100 in FIG. 3 includes a power supply 116, which supplies power to the drives 120a–j via power and control lines 142. The power and control lines 142 are shown separate from data and control line(s) 130, but such lines may be within the same conduit and perhaps share the same wiring where appropriate.

The disk array controller 112 is operatively coupled to power switch control (PSC) 114, which may also be called the power-switch controller. With direction from the disk array controller 112, the PSC 114 selectively controls the activation and deactivation of specific drives 120a–j of the disk array 120 via the operatively coupled power and control lines 142. Each drive of drives 120a–j has an associated power activation switch 140a–j, which switchably couples each drive to the power supply 116.

Figure 1:
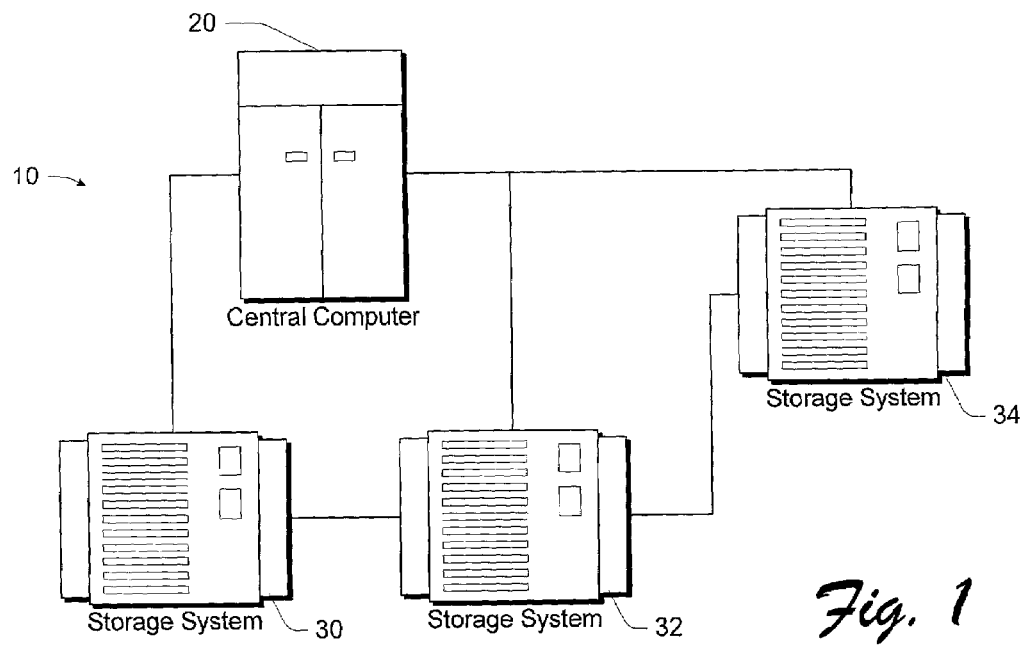
FIG. 1 illustrates, at a high-level, a conventional computer network that includes multiple storage systems.
Figure 2:
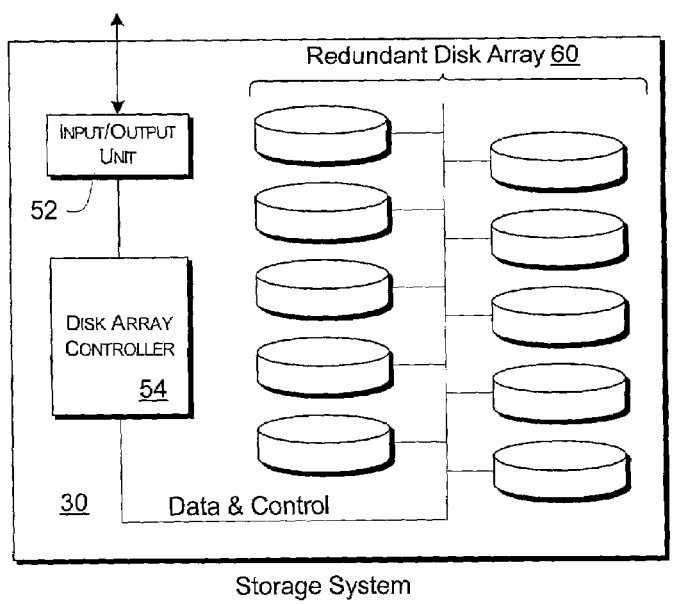
FIG. 2 is a block diagram of the basic components of a conventional storage system.

Switches 140a–j may be any electronically controllable switches. In the exemplary storage system, the switches are a solid-state electronic component (such as a FET). Such switches may be part of a drive's internal circuitry or they may be external to the drive. Unlike a conventional storage system (such as storage system 30 illustrated in FIGS. 1 and 2), the disk drives 120a–j in the disk array 120 are selectively powered on ("activated") or off ("deactivated") by the PSC 114 under direction from the disk array controller 112.

Switches 140a, 140b, 140c, 140e, 140g, and 140i are closed and thus allowing power to flow to their associated drives (120a, 120b, 120c, 120e 120g, and 120i). Therefore, these drives are active. Since these drives are active, their lifespan is decreasing each second and they will eventually fail. Their MTBF is an estimate of that lifespan, but the actual lifespan of each drive is unknown.

For example, assume that these six drives (120a, 120b, 120c, 120e, 120g, and 120i) form an active RAID of 5+1 (which is five disks of data and one disk of redundancy parity data). Electricity is flowing through its circuitry and its parts are moving. Its lifespan is decreasing.

Switches 140d, 140f, 140h, and 140j are open and thus no power is flowing to their associated drives (120d, 120f, 120h, and 120j). Therefore, these drives are inactive. No electricity is flowing through the circuitry of these drives. No parts are moving in these drives. Since these drives are inactive, their lifespan is unchanged and unaffected.

For example, if a drive fails (such as drive 120c), the disk array controller 112 instructs the PSC 114 to activate one of the inactive drives (such drive 120h). Thus, the newly activated drive 120h replaces just-failed drive 120c within the RAID of 5+1 disks. Therefore, a minimum amount of time is spent with a danger of data loss before the failed drive is replaced in the RAID with a new active drive.

Methodological Implementation of Exemplary Storage-Device Activation Control

Figure 4:
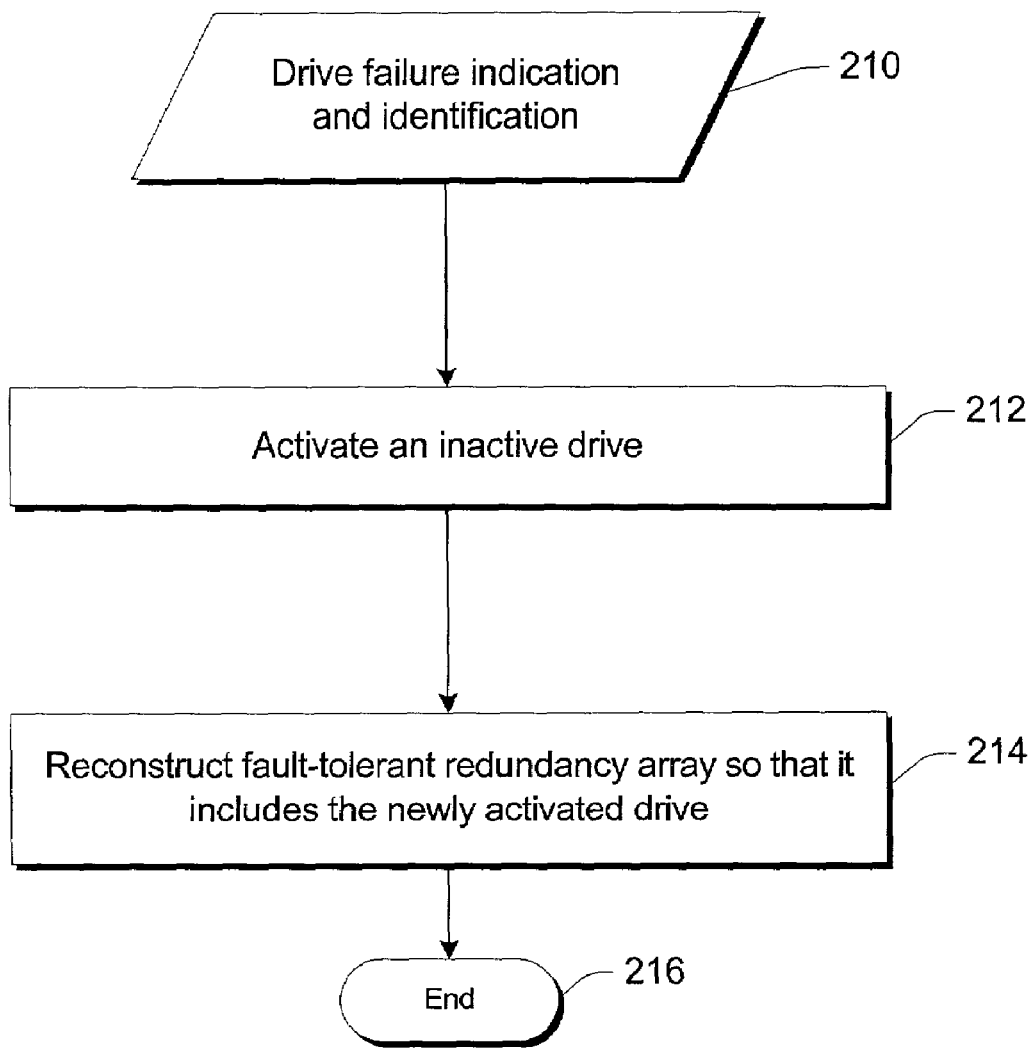
FIG. 4 is a flow diagram of a methodological implementation of a storage-device activation control for a high-availability storage system.

FIG. 4 shows a methodological implementation of an exemplary storage-device activation control performed by a storage system (or a portion thereof), such as storage system 100 of FIG. 3. This methodological implementation may be performed in software, hardware, or a combination thereof.

At 210 of FIG. 4, the disk array controller 112 receives an indication of a drive failure and an identification of which drive that failed. The drive is a member of a fault-tolerant redundancy array of drives. At 212, the disk array controller 112 activates one of a set of inactive drives. For example, it may direct the PSC 114 to activate drive 120h. The PSC does this by switching the drive's associated switch, which is switch 140h, from an open position to a closed position.

At 214, the disk array controller 112 reconstructs the fault-tolerant redundancy array so that the newly activated drive 120h replaces the failed drive. The data arrangement of the redundant array is reconstructed with drive 120h as part of the array. The process ends at 216.

Exemplary Data Tracking System of Exemplary Storage-Device Activation Control

Figure 5:
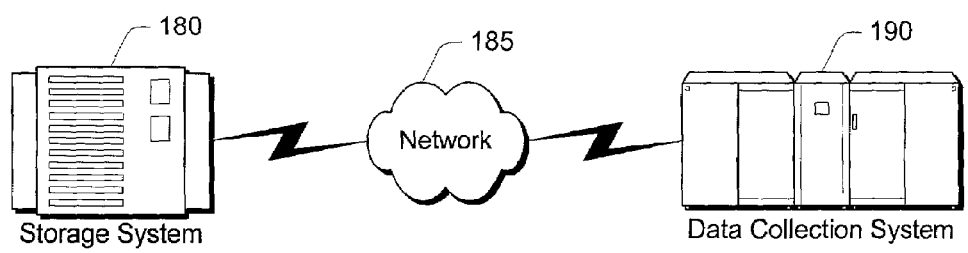
FIG. 5 illustrates, at a high-level, a computer network with a storage system implementing storage-device activation control for a high-availability storage system and a data collection system for receiving empirical data sent by such storage system.

FIG. 5 shows a high-level view of a storage system 180 coupled to a data collection system 190 via a network link 185. Storage system 180 includes the same basic components of storage system 100 of FIG. 3. The storage system 180 illustrated in FIG. 5 implements a data tracking system of an exemplary storage-device activation control.

Since the disk array controller 112 dynamically controls the activation of drives and monitors their failures, it can track the actual operational life of a drive from initial activation to eventual failure. This is an empirical measurement of drive life and how it was actually used in the field. This is not a statistical estimation or model.

After the storage system has collected empirical data regarding the drives' lifespan, it can transmit that data to a data collection system 190 via a network link 185, such as the Internet. The storage system may provide various types of information about a drive, such as:
- brand;
- model;
- serial number;
- components and features (e.g., number of cylinders, platters, segments, etc.);
- in-service timespan (which may include day and time of activation and failure);
- type of failure;
- usage patterns during that lifespan, during each day, during an average day, etc.

An array manufacturer may host the data collection system 190. It will use the field-derived, empirical data about actual in-service time of storage devices (such as a drives) to accurately calculate the MTBF. Since the MTBF calculation will be based upon measurements of actual in-service time in the field, the MTBF will accurately estimate the lifespan of a drive. Such a MTBF calculation may be termed an AMTBF (for Actual MTBF) calculation.

Methodological Implementation of Exemplary Data Tracking

Figure 6:
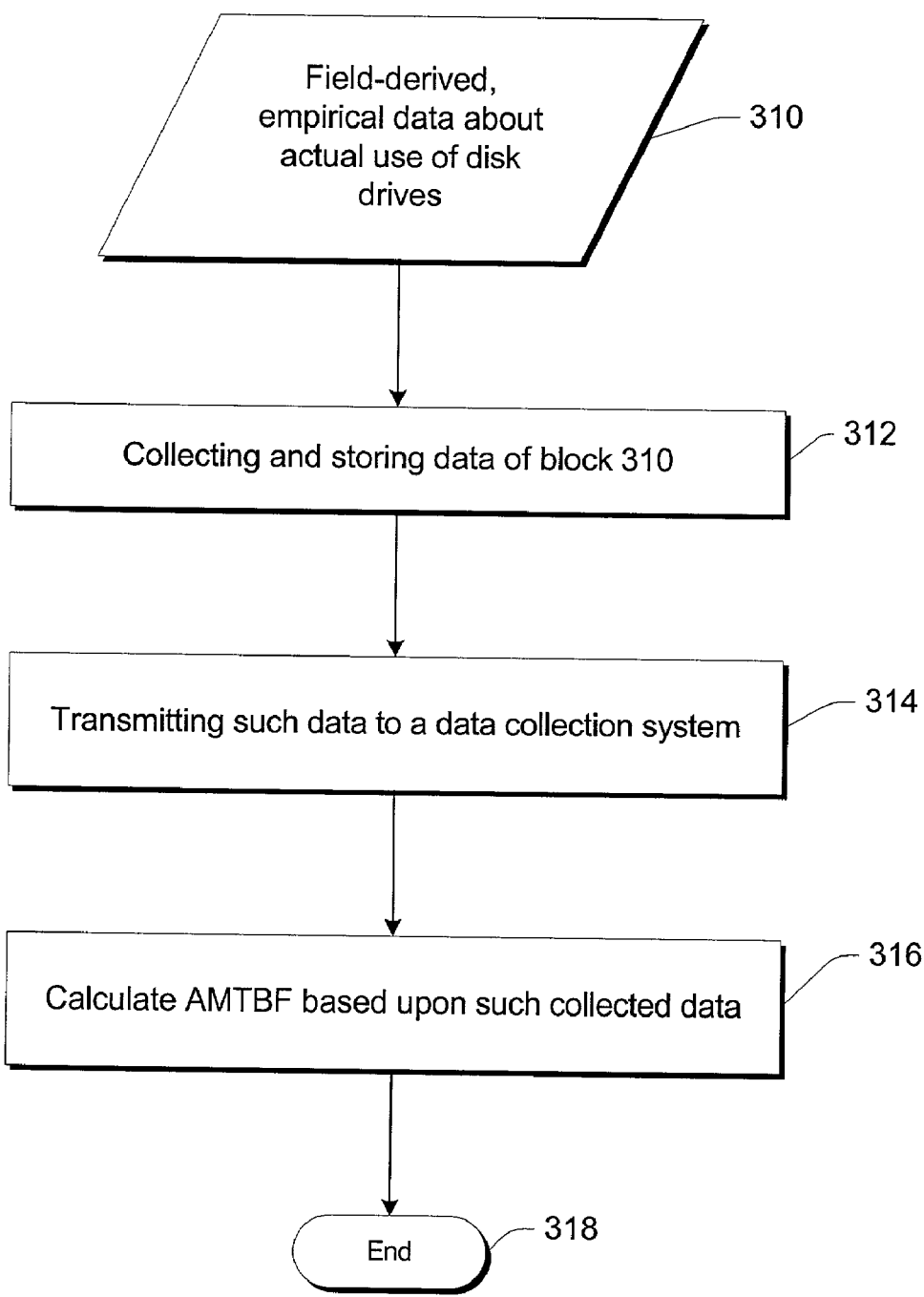
FIG. 6 is a flow diagram of another methodological implementation of storage-device activation control for a high-availability storage system.

FIG. 6 shows a methodological implementation of exemplary data tracking of an exemplary storage-device activation control performed by a storage system (or a portion thereof), such as storage system 100 of FIG. 3 and storage system 180 of FIG. 5. This methodological implementation may be performed in software, hardware, or a combination thereof.

At 312 of FIG. 6, a storage system gathers and stores field-derived, empirical data about actual in-service time of storage devices (such as disk drives) from block 310. At 314, the storage system occasionally sends such data to a data collection system (such as system 190 in FIG. 5). The storage system may send the data on a regular timed basis, based upon a user instruction to do so, based upon instructions from a data collection system, when a drive fails, or other such triggering event.

At 316, the collected data is used to calculate AMTBF (actual MTBF) of the storage device associated with that data. The process ends at 318.

The in-service data can also be used to predict the future failure of units that have either not accumulated in-service time as quickly or were deployed at a later time. The enables predictive replacement of drives that are nearing their expected life.

Alternative Implementation of Storage-Device Activation Control

Rather than powering up a drive to replace a failed drive in a redundant array, an alternative implementation of an exemplary storage-activation control device may intelligently choose to power down one or more existing active drives in a redundant array. If it is determined that a portion of available storage space is unnecessary, the control may choose to deactivate a number of storage devices equivalent to the portion of unnecessary storage space. Conversely, if additional storage space is needed, the control may activate inactive devices to provide such additional storage space.

Other than abstract efficiency reasons, it is desirable to only have just enough storage devices active in a redundant array to satisfy the storage needs of the present and the near future. Why? Doing so, minimizes costs by doing the following:
- increasing the effective lifespan of a storage device by deactivating it when not needed;
- decreasing cooling costs by reducing the number of devices generating heat; and
- decreasing power costs by reducing the number of devices drawing electricity.

Exemplary Characteristics of Exemplary Storage-Device Activation Control

Exemplary characteristics of the exemplary storage-device activation control, may include, but are not limited to, the following:
- automated control by a storage system of its storage devices;
- automated activation control of storage devices so that such device may be selectively powered on or off;
- tracking of time-in-service type statistics by individual storage device;
- central data collection and reporting system to collect and analyze the in-service statistics of storage devices; and
- failure prediction by analyzing actual field failure statistics of like mechanisms.

Examples of Benefits of Exemplary Storage-Device Activation Control

Examples of benefits of the exemplary storage-device activation control, may include, but are not limited to, the following:
- online and available spare storage devices reduce the time a redundancy array will exist in a non-redundant state (or in a state of lesser redundancy); in such a state, data loss may occur if another storage device fails;
- keeping the online and available spare storage devices in a powered down (inactive) state optimizes their life expectancy, thereby preventing the conventional device-failure recovery situation (e.g., like with RAID) where redundancy is re-established using an active storage device which has already seen most if its functional life;
- keeping the storage devices of unused redundancy arrays in a powered down state reduces power consumption; reduces acoustic levels, reduces thermal levels, and optimizes life expectancy of the devices;
- failure prediction (based upon field-derived, empirical data about actual in-service time of storage devices) enables the preventative replacement of storage devices, thus avoiding exposure to loss of redundancy that occurs when storage devices are allowed to fail while in service;
- failure prediction also enables supply chain optimization for manufacturers and distributors by predicting demand for replacement units prior to failure;
- failure prediction further enables predictive shipment of replacement devices, thereby reducing the reliance on expensive express delivery shipments.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A system comprising:
    a storage-device activation control subsystem comprising a power-switch controller coupled to a set of storage devices and configured to selectively power-on one or more of such devices in the set;

a data tracking subsystem configured to track in-service statistics of a storage device;

wherein the set of storage devices comprises at least two mutually exclusive subsets of storage devices, the subsets comprising:

a first subset of storage devices collectively configured to be a fault-tolerant redundant array, wherein the devices in the first subset are active;

a second subset of storage devices, wherein the devices in the second subset are inactive;

the controller being adapted to power-on at least one device from the second subset to replace at least one device in the first subset with the just powered-on device from the second subset.

2. A system as recited in claim 1, wherein the set of storage devices is a redundant array of disk drives.

3. A system as recited in claim 1, wherein the storage devices are disk drives.

4. A system as recited in claim 1 further comprising a fault-tolerant redundant array of storage devices, the array being coupled to such an activation control system and the array comprises, at least in part, the set of storage devices.

5. A system as recited in claim 1, wherein the statistics are based upon tracking activation time of the device and time of failure of the device.

6. A storage-device activation/deactivation control method comprising:

making a determination as to whether to change an activation status of at least a first storage device of a first set of storage devices, wherein the activation status of the storage devices in the first set are powered-on;

changing the activation status of the first storage device in response to the determination;

wherein the making a determination comprises:

obtaining an indication of excessive available storage space collectively provided by the first set of storage devices;

determining to deactivate the first storage device.

7. A method as recited in claim 6, wherein the making comprises:

obtaining an indication of failure of at least a second storage device which is a member of a second set of storage devices, wherein the activation status of the storage devices in the second set is powered-on;

determining to activate the first storage device.

8. A method as recited in claim 7 further comprising:

logically removing the first storage device from the first set of storage devices;

logically replacing the second storage device with the first storage device in the second set of storage devices.

* * * * *